Patented July 9, 1940

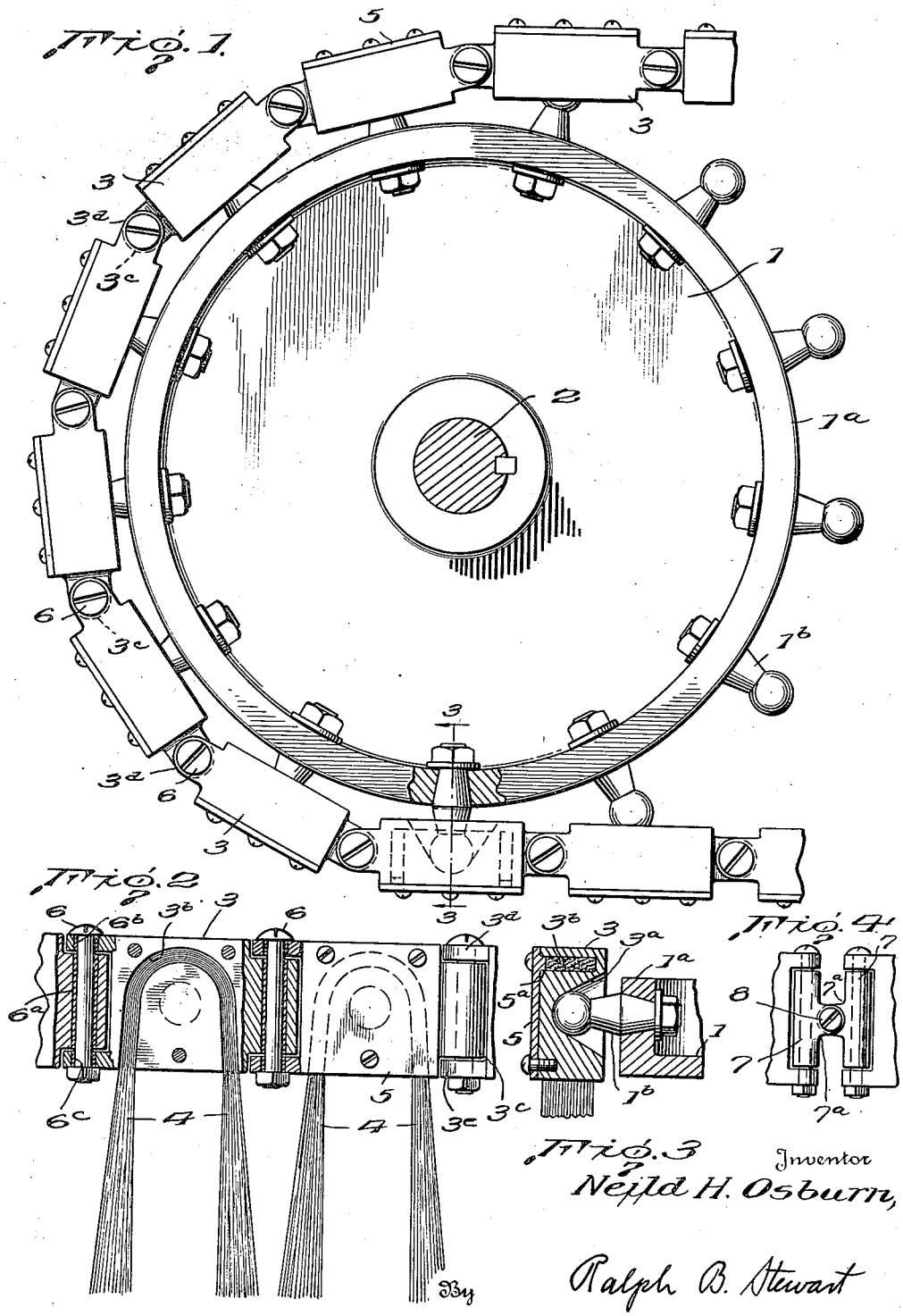

2,207,330

UNITED STATES PATENT OFFICE 2,207,330

CHAIN BRUSH

Neild H. Osburn, Pasadena, Calif.

Application February 12, 1937, Serial No. 125,495

13 Claims. (Cl. 15—21)

This invention relates to brushes and in particular to brushes of the link-belt or chain type.

An object of my invention is to devise a brush of the chain type which is rugged, simple of construction, and effective in use.

In a brush according to my invention, each link of a chain has secured thereto a quantity of bristles so that each link forms an individual brush element of the chain brush. The links are preferably joined together in a manner to allow at least a limited amount of universal movement of one link with respect to the adjacent link, thus allowing the brush to follow an irregular surface.

A further object of my invention is to devise a novel construction of links to cooperate with a novel sprocket for driving the chain brush.

A further object of my invention is to devise a sprocket for driving the chain brush having removable teeth which may be replaced when they become unserviceable, thereby avoiding replacement of the entire sprocket.

Still another object of my invention is to devise a novel construction for securing bristles to the individual links of the chain. I prefer to support the bristles in recesses formed in the links surrounding the sprocket recesses formed in the links for receiving the sprocket teeth.

A further object is to provide for the ready replacement of the bristles in the links when the bristles become worn.

In the brush of my invention, the bristles are mounted in the links of the chain so that they remain substantially parallel to the axis of the driving sprocket.

My invention is illustrated in the accompanying drawing in which

Figure 1 is a fragmentary plan view showing several links of a chain brush according to my invention arranged in cooperative relation upon a driving sprocket;

Figure 2 is a fragmentary view showing two links of the chain brush in elevation, two of the joints between adjacent links being shown in section;

Figure 3 is a sectional view taken along line 3—3 of Figure 1; and

Figure 4 is a fragmentary view showing a modified arangement for joining adjacent links of the chain.

Referring to the drawing, 1 indicates a driving sprocket mounted upon a driving shaft 2. The sprocket 1 is provided with a cylindrical flange 1a at its periphery, and this flange carries a number of removable and interchangeable teeth 1b. As shown in the sectional view at the bottom of Figure 1, and in Figure 3, the teeth are provided with a tapered shank seated in a tapered hole formed in the flange 1a and the teeth are secured to the flange by a nut threaded on the inner end of each tooth. A lock-washer is inserted between each nut and the flange to prevent the teeth from becoming loose. The outer ends of the teeth are formed with spherical shape and engage sockets formed in the sides of the links, see Figures 1 and 3. A number of link elements 3 are shown in position on the sprocket wheel 1 in Figure 1, and it will be understood that the chain extends to the right of Figure 1 and passes around another sprocket (not shown) like sprocket 1 which may be either an idler sprocket or a driven sprocket. Any suitable machine may be employed to support said sprockets in spaced relation and to move them to various positions to accomplish different brushing operations. Since such machines are known, the details will not be described here. Any suitable source of power may be employed to drive one or both sprockets.

The details of construction of the link elements are illustrated in Figures 2 and 3. Each link is formed of a body 3 (preferably a casting) having a conical recess 3a formed in one side for receiving a sprocket tooth 1b. The bottom of recess 3a is shaped to conform with the shape of the head of tooth 1b. On the opposite side of link 3 from recess 3a, the link is provided with an inverted U-shaped recess 3b for receiving the bristles 4. As will be seen, recess 3b is formed in the material surrounding recess 3a, so that the bristles 4 are substantially centered with respect to the head of the sprocket tooth. As shown in Figure 2, the ends of the bristles 4 are bent back on each other into substantially parallel relation and the looped portion of the bristles is located in the U-shaped recess 3b. For the purpose of holding the bristles in the links, I provide a cover plate 5 secured to the side of the link by suitable screws, and the cover plate is provided with a U-shaped projection 5a on the inner face of the plate, and this projection extends into the U-shaped recess 3b and serves to securely clamp the bristles in the recess when the screws are tightened. The cover plate for the left-hand link in Figure 2 has been omitted, but the cover plate has been shown in position on the right-hand link of Figure 2. While I have shown three screws for securing the cover plate 5 to the link 3, it will be understood that by making the link of greater thickness at the bottom of the recess 3a, a single screw may be used at the center of the plate for clamping the plate to the link.

The bristles 4 may be formed of steel wire, hickory or bamboo splits, broom straw, hair or any other known type of bristle. Also, the recess 3b may be formed so that the ends of bristles 4 lie at any desired angle with respect to each other, and it is not necessary that they be substantially parallel, but I prefer the arrangement shown.

In the arrangement shown in Figure 2, the right-hand end of each link is provided with a tongue 3c, and the left-hand end is bifurcated, or is provided with spaced lugs 3d and 3e. The tongue of one link is located between the lugs 3d and 3e of the adjacent link, and adjacent links are pivotally joined together by a bolt 6 passing through holes formed in the tongue and the two cooperating lugs. The bolts 6 are secured in position by suitable nuts as shown. Suitable clearances may be allowed between the bolt 6 and the holes passing through these elements to permit limited universal movement of one link with respect to the other, whereby flexibility is imparted to the brush to permit it to follow a surface of irregular contour. I prefer to make these clearances rather large and to arrange vulcanized rubber bushings 6a, 6b and 6c in these clearance spaces. Also, rubber washers may be arranged between tongue 3c and lugs 3d and 3e. These bushings and washers permit relative movement between adjacent links and at the same time prevent grit and dirt from entering the pivotal connections between adjacent links. The bushings and washers may be formed separately and inserted in the links, or they may be formed in place, and may be vulcanized to the metallic surfaces of the link.

In Figure 4, I have shown a modified arrangement for connecting adjacent links to permit universal movement of one link with respect to another. In this arrangement, each end of each link is bifurcated and a bracket member 7 is pivotally secured in the bifurcated end by a bolt as shown, and each bracket is provided with a flat lateral extension 7a. Brackets 7—7 on adjacent links are pivotally secured together by a screw or bolt 8 passing through extensions 7a—7a, the axis of screw 8 being arranged at right angles to the axis of the screws passing through the bifurcated ends of the links. This construction permits free movement of one link with respect to another in any angular direction over a limited range. It is obvious that instead of using two brackets 7 as in Figure 4, the left end of each link may have the extension 7a formed integral therewith.

The chain brush may be opened at any point by removing one of the bolts 6 in Figure 2 or one of the bolts 8 in Figure 4. The construction permits ready replacement of any link which needs repairs. While the novel chain and sprocket arrangement disclosed herein is particularly useful for a chain brush, it is obvious that it may be used in other applications requiring a sprocket driven chain.

As shown by the lower link in Figure 1, the center of curvature of the bottom of the sprocket recess in the link is located substantially on the line joining the centers of the two bolts 6, 6 which connect the link with the adjacent links, and the bristles of the brush are also substantially centered with respect to this line and to the center of curvature of the bottom of the sprocket recess. By this construction, the bristles are substantially equally divided on each side of the axis of the chain and on each side of the pitch diameter of the sprocket wheel.

The chain brush which I have devised may be used for any purpose for which a rotary brush is used. It may be used on a street sweeper, or on a sweeper for any other surface. It may also be used for polishing floors or other surfaces, whether horizontal or vertical. In the operation of the brush, if the brush is moved at right angles to the direction of movement of the chain, the sweeping action is the same as that obtained from sweeping with an ordinary handbroom edgewise rather than flatwise. The flexibility of the chain will permit the brush to follow uneven surfaces such as may be encountered in street sweeping. Also, due to the flexibility of the chain, suitable idler sprockets may be arranged to allow one portion of the brush to sweep a surface on one angle and the other portion to sweep a surface at a different angle. The conical shape of the sprocket recesses in the links will act to center the links and to maintain the chain in the desired direction of operation. Idler sprockets may also be spaced along the chain at suitable points for the purpose of maintaining the brush in contact with a surface which might be lower than the surface engaged by other parts of the brush.

While I prefer to use the construction illustrated in the drawing wherein the sprocket teeth are formed separate from the sprocket wheel, it will be understood that the teeth may be formed integral with the wheel, if desired. It will also be understood that the sprocket teeth may assume some shape other than the spherical shape illustrated and may assume the shape of a conventional sprocket tooth, and, if desired, the sprocket teeth may extend entirely through the link of the chain in the conventional manner so the links are seated on the periphery of the wheel. In this arrangement, the bristles would still lie in a U-shaped cavity surrounding the sprocket opening in the link. Furthermore, where the sprocket teeth are seated in sockets in the links, suitable grooves may be provided in the surface of the socket to permit grit or dirt to escape from the socket and prevent the socket from being ground away.

What I claim is:

1. In a chain brush, a link construction comprising a link body having a sprocket recess formed therein, and bristles carried by said body, said bristles being looped around said sprocket recess and having both ends thereof extending from the body on the same side thereof.

2. In a chain brush, a link construction comprising a link body having a sprocket recess formed therein, bristles carried by said body and arranged to loop around said sprocket recess with the opposite ends of said bristles extending from said link body substantially parallel to each other and at right angles to the axis of said sprocket recess.

3. In a chain brush, a link construction comprising a link body having a sprocket recess formed in one face thereof, a recess formed in the other face of said link body and partly surrounding said sprocket recess, bristles located in said second recess, and means for retaining said bristles in said recess.

4. In a chain brush, a link construction comprising a link body having a conical recess formed in one face thereof, and a U-shaped recess formed in the opposite face thereof, said U-shaped recess being formed in the material of said link body surrounding said conical recess and being substantially centered with respect to said conical recess, and brush bristles located in said U-shaped recess.

5. In a chain brush, a link construction comprising a link body having a conical recess formed in one face thereof, and a U-shaped recess formed in the opposite face thereof, said U-shaped recess being formed in the material of said link body surrounding said conical recess and being substantially centered with respect to said conical recess, brush bristles located in said U-shaped recess, and a cover plate removably secured to said body for clamping the bristles in said U-shaped recess.

6. In combination, a sprocket wheel having sprocket teeth with spherical shaped ends, a chain arranged on said sprocket wheel and formed of a plurality of link elements, each link comprising a body having a conical recess formed in one face thereof for receiving a sprocket tooth, the bottom of said recess being shaped to conform with the shape of the end of said sprocket teeth.

7. In combination, a sprocket wheel having sprocket teeth with spherical shaped ends, a chain arranged on said sprocket wheel and formed of a plurality of link elements, each link comprising a body having a conical recess formed in one face thereof for receiving a sprocket tooth, the bottom of said recess being shaped to conform with the shape of the end of said sprocket tooth, adjacent links of said chain being pivotally secured together on pivotal centers substantially in line with the center of curvature of the bottom face of said conical recess.

8. In combination, a sprocket wheel having sprocket teeth with spherical shaped ends, a chain arranged on said sprocket wheel and formed of a plurality of link elements, each link comprising a body having a conical recess formed in one face thereof for receiving a sprocket tooth, the bottom of said recess being shaped to conform with the shape of the end of said sprocket tooth, a U-shaped recess formed in said body around said conical recess, and bristles located in said U-shaped recess and having opposite ends thereof extending beyond said body substantially parallel to each other and substantially parallel to the axis of said sprocket wheel.

9. In combination, a sprocket wheel having sprocket teeth with spherical shaped ends, a chain arranged on said sprocket wheel and formed of a plurality of link elements, each link comprising a body having a conical recess formed in one face thereof for receiving a sprocket tooth, the bottom of said recess being shaped to conform with the shape of the end of said sprocket tooth, a U-shaped recess formed in the opposite face of said body from said conical recess, said U-shaped recess being formed in the material of said link body surrounding said conical recess and being substantially centered with respect to said conical recess, brush bristles located in said U-shaped recess and having opposite ends thereof extending beyond said body substantially parallel to each other and substantially parallel to the axis of said sprocket wheel, and a cover plate removably secured to said body for clamping the bristles in said U-shaped recess.

10. A toothed sprocket comprising a wheel having a cylindrical flange formed on the periphery thereof, said flange having a plurality of equally spaced tapered round holes formed radially therein, and a plurality of sprocket teeth having tapered round shanks seated in said tapered holes, said sprocket teeth being removable and interchangeable and having spherical shaped ends.

11. A toothed sprocket comprising a wheel having a cylindrical flange formed on the periphery thereof, said flange having a plurality of equally spaced tapered round holes formed radially therein, and a plurality of sprocket teeth having tapered round shanks seated in said tapered holes, said teeth being secured to said flange by nuts threaded on the inner ends thereof, and the outer ends of said teeth being formed with a spherical surface.

12. A chain brush comprising a plurality of link elements pivotally joined together to form an endless band, each link comprising a body having a sprocket recess formed therein normal to the pivotal axes joining said links, and bristles carried by said body, said bristles being looped around said sprocket recess with the opposite ends of said bristles extending from said link body substantially parallel to each other and substantially parallel to the pivotal axes joining said links.

13. In combination, a sprocket wheel having sprocket teeth, a chain arranged on said sprocket wheel and formed of a plurality of link elements, each link comprising a body having a sprocket recess formed in one face thereof for receiving a sprocket tooth, a U-shaped recess formed in said body on the opposite side thereof from said sprocket wheel and surrounding said sprocket recess, brush bristles located in said U-shaped recess and having opposite ends thereof extending beyond said body substantially parallel to each other and substantially parallel to the axis of said sprocket wheel.

NEILD H. OSBURN.